United States Patent [19]

Fancy

[11] 4,154,395

[45] May 15, 1979

[54] REDUNDANT SIGNAL CIRCUIT

[75] Inventor: Thomas A. Fancy, Westminster, Mass.

[73] Assignee: General Electric Company, Schenectady, N.Y.

[21] Appl. No.: 854,973

[22] Filed: Nov. 25, 1977

[51] Int. Cl.² .............................................. G06F 11/00
[52] U.S. Cl. .................................... 235/307; 307/204; 307/219
[58] Field of Search .............. 235/307; 340/146.1 BE; 307/204, 219; 364/119

[56] References Cited

U.S. PATENT DOCUMENTS

| | | | |
|---|---|---|---|
| 3,289,097 | 11/1966 | Martin | 307/219 X |
| 3,479,603 | 11/1969 | Overstreet, Jr. | 307/204 X |
| 3,800,164 | 3/1974 | Miller | 307/204 |
| 3,803,425 | 4/1974 | Carp | 307/219 |
| 4,025,762 | 5/1977 | Rossi et al. | 364/119 |
| 4,032,757 | 6/1977 | Eccles | 235/307 X |

Primary Examiner—David H. Malzahn
Attorney, Agent, or Firm—James W. Mitchell; John F. Ahern

[57] ABSTRACT

The reliability of any system can be enhanced by redundancy. In a turbomachine control system, increased reliability through redundancy is particularly desirable in view of the consequences of an unscheduled shutdown. One area of a turbomachine controls system which is particularly suited to redundant modeling is the speed control circuits. Speed pick-up probes may be subject to severe duty and are critical to the speed control of a turbomachine since they provide the speed feedback signal. The present invention is a solid state circuit which provides an output signal even if either one of two redundant speed feedback probes should fail. This circuit also allows probe replacement while the turbomachine remains in service.

6 Claims, 2 Drawing Figures

REDUNDANT SIGNAL CIRCUIT

BACKGROUND OF THE INVENTION

This invention relates, in general, to redundant signal circuits; and in particular, this invention relates to control systems for rotating machines.

Turbomachines are dependable operators which may perform for many years without an unscheduled shutdown. However, the reliability of a turbomachine is dependent upon many different parts and, in particular, the control system of the machine. Machines which utilize the so called mechanical hydraulic controls achieve great reliability through careful manufacture and maintenance. Machines which utilize electronic controls may operate with increased reliability through redundant controls packages not possible with the larger mechanical hydraulic controls.

U.S. Pat. No. 4,025,762 issued May 24, 1977 and assigned to the assignee of the present invention shows one example of a turbomachine controls system and is incorporated into this application by this reference thereto. Speed control of the turbomachine is achieved by positioning a steam valve which controls the amount of inlet steam to the turbine. The steam valve is controlled by a valve operator which, in turn, is electronically controlled by a speed error signal. The speed error signal is derived from the electronic summation of a speed reference signal and a speed feedback signal. The speed feedback signal is obtained through an electronic device well known in the art and which may include a shaft mounted toothed wheel having a magnetic pick-up in proximity thereto. It is clear, that in order for the automatic turbine control system to operate, the feedback speed signal must be operative. To ensure continued availability of a speed feedback signal, the present invention provides for redundant speed pick-ups and dual signal channels with switching logic there between so that if one signal channel becomes inoperative, the other signal channel will supply a valid speed feedback signal.

The foregoing continued availability of a speed feedback signal is implemented through the use of electronic circuitry which includes dual J-K flip-flops with clear. This device receives at least a portion of each of two redundant speed feedback signals. One signal is used to clear the other signal in the device. Should the clear signal fail, then the other signal takes over as the dominant signal.

It is one object of the present invention to provide a redundant signal circuit which will tolerate failure to either one of two signal inputs and still remain operative.

It is a corollary object of the present invention to provide a signal circuit which will remain operative even as one or the other signal inputs is being replaced.

While the present invention is set forth in terms of a speed feedback device, it is not intended that it be so limited. The present invention is applicable to any redundant signal device wherein it is desirable to maintain an output signal despite failure of one of the two input signals. The noval features believed characteristic of the present invention are set forth in the appended claims. The invention itself, however, together with further objects and advantages thereof, may best be understood with reference to the following description, taken in connection with the drawings.

DETAILED DESCRIPTION OF THE INVENTION

Figure 1:
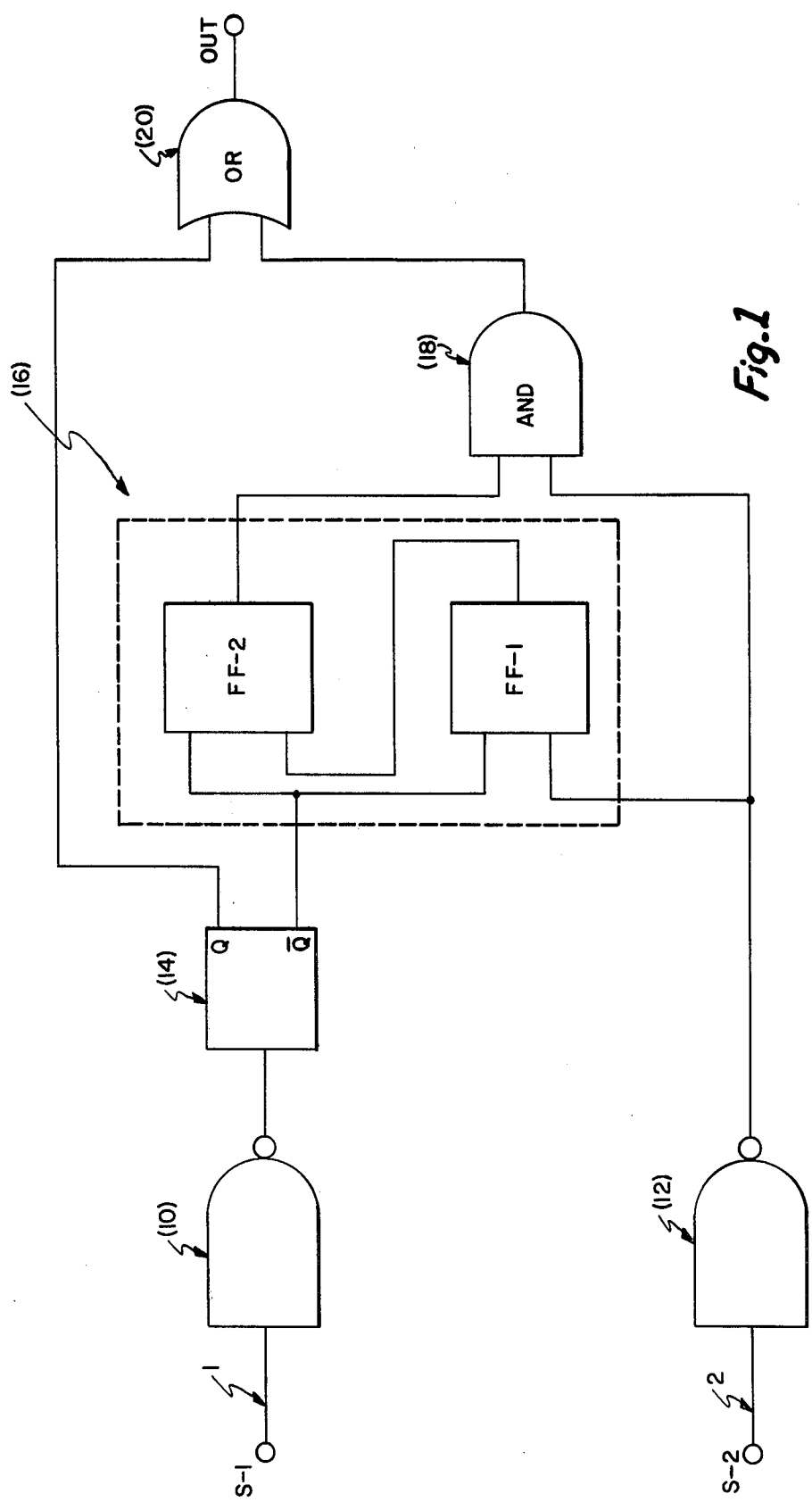
FIG. 1 is a schematic drawing of the present invention.

FIG. 1 shows in schematic form what is intended to be the preferred embodiment of the present invention. There are two redundant channels 1, 2 with respective signal inputs S-1 and S-2. Each signal is in the form of a digital pulse train having a frequency proportional to a measured quantity such as speed, temperature, pressure, etc. In the present example, the measured quantity is speed from a turbomachine and each signal may be obtained in a well-known manner from redundant speed pick-ups (not shown). Each signal is input into a respective Schmitt Trigger Circuit 10, 12 each, of which, provides an output pulse train proportional to its respective input signal. Each Schmitt Trigger Circuit gives sharp definition to its respective input signal and therefore is a signal conditioning circuit. If each input signal (i.e., each signal pick-up) is operative, then the theoretical outputs of the Schmitt Triggers in channels 1 and 2 will be identical.

The output of Schmitt Trigger 10 is input into a one shot monostable multivibrator circuit 14 which provides Q and $\bar{Q}$ output pulse trains which are identical in frequency but inverse to one another. The Q output is connected to an "OR" gate 20 and becomes the circuit output signal. If there is a failure in the input S-1 as, for example, a failure in a transducer or signal pick-up, then the Q output will fail low, and the $\bar{Q}$ output will fail high allowing the channel 2 input signal to take over in a manner to be explained.

The $\bar{Q}$ output of the miltivibrator provides a clearing pulse into a dual J-K flip-flop circuit 16. Flip-flop circuit 16 is comprised of flip-flop one (FF-1) and flip-flop two (FF-2). The clear inputs into the flip-flops designated as $\bar{Q}$ output from multivibrator 14 override the other inputs into the flip-flops FF-1 and FF-2 which causes the FF-2 output into an AND gate 18 to remain low. If one input to the AND gate is low, then the output of the AND gate is low.

If the clear pulses $\bar{Q}$ are stopped, then the following occurs with respect to the output of J-K flip-flop 16. On the first high to low transition of the signal in channel 2, FF-1 will switch to high. On the second high to low transition, FF-1 will switch low. The high to low transition at the output of FF-1 causes FF-2 to latch high regardless of further changes at the input. The high output of FF-2 then is input into the AND gate which in effect "opens" the gate. With one input high, the AND gate output follows the other input which is the channel 2 input signal. The Q output of the one shot multivibrator is low because the channel 1 input signal has failed.

Figure 2:
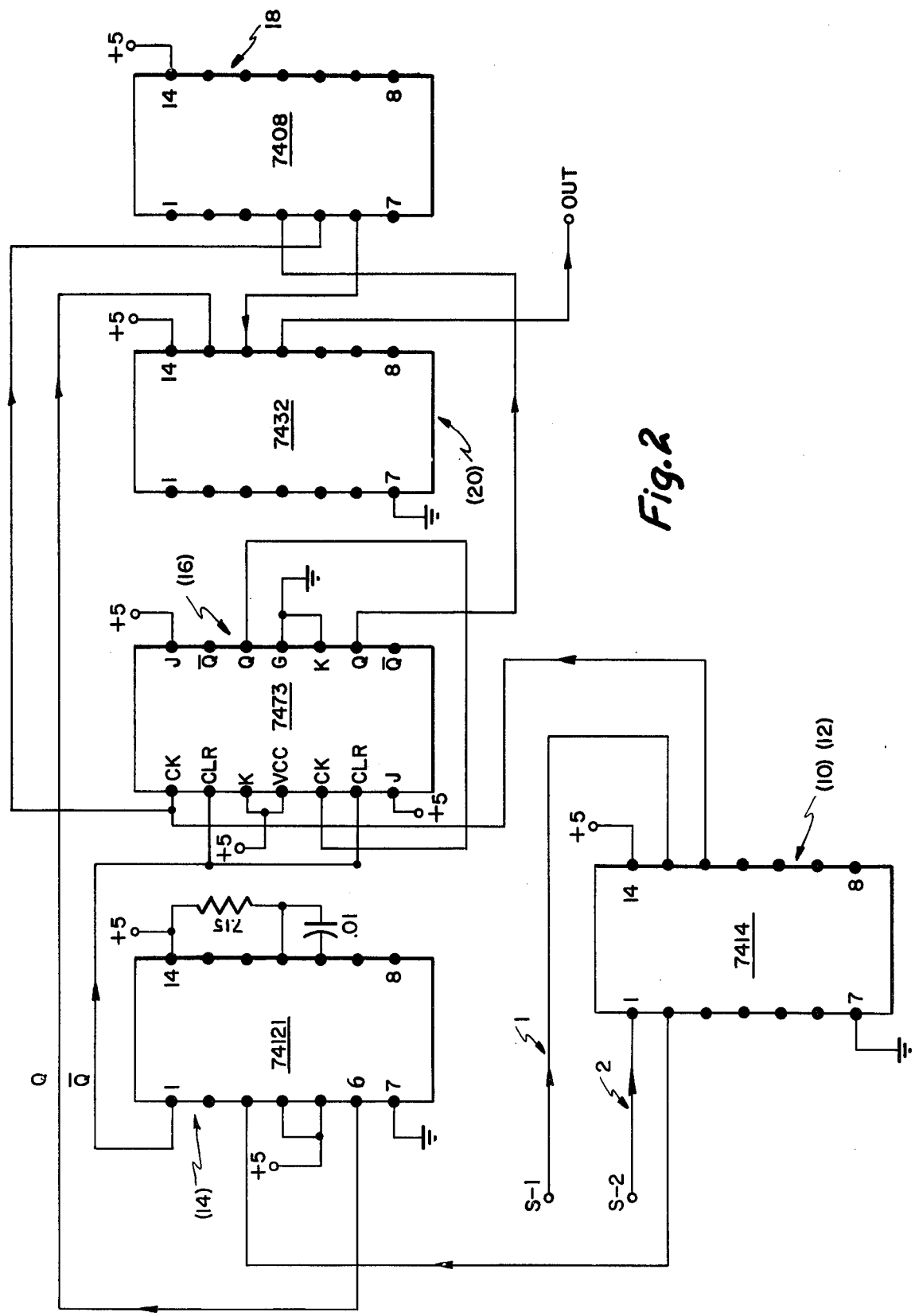
FIG. 2 is a circuit drawing of the present invention.

Referring to FIG. 2, there are two redundant signal channels which have pins S-1 and S-2 respectively connected to transducers or signal pick-ups (not shown). FIG. 2 discloses a circuit model according to a preferred example of the present invention. All circuit modules are obtainable under the designated number from Texas Instruments, Inc. of Dallas, Texas.

The two Schmitt Triggers shown in FIG. 1 at 10 and 12 are combined into a Hex Schmitt Trigger inverter under the designation 7414. Note that pin connections are made, as shown, including a 5 volt positive power supply.

The channel 1 signal output of the Schmitt Trigger circuit is input into a divider means including a monostable multivibrator 74121 which provides Q and $\bar{Q}$ outputs from pins 6 and 1 respectively. The channel 2 signal output of the Schmitt Trigger circuit is input into a logic means comprising a Dual J-K Flip-Flop with Clear designated 7473.

The multivibrator Q output is input into an OR gate 7432 which also includes an input from AND gate 7408. The AND gate 7408 receives inputs from channel 2 and the J-K flip-flop and provides an output or OR gate 7432. The circuit output is designated as OUT.

The operation of the device is as follows. Assuming signal input pins S-1 and S-2 to be connected to transducers or signal pick-up devices (not shown), if both pick-ups are working the circuit output signal will be the channel 1 input signal. The channel 2 input signal will be inhibited at AND gate 7408 as the $\bar{Q}$ output from multivibrator 74121 clears any output from J-K flip-flop 7473.

If pick-up 2 should fail, the device still operates through channel 1 as if both pick-ups were operative. Naturally, some sort of warning device could be included to notify an operator that either one of the pick-ups has failed. If pick-up 1 fails, the $\bar{Q}$ output of multivibrator 74121 remains high and the output of J-K flip-flop latches high thereby allowing the channel 2 signal to pass through the AND gate. At the OR gate, the signal Q in channel 1 will be low and the channel 2 signal will then be able to pass through.

While there is shown what is considered at present, to be the preferred embodiment of the invention, it is, of course, understood that various other modifications may be made therein. It is intended to claim all such modifications as fall within the true spirit and scope of the invention.

What is claimed is:

1. A redundant signal circuit having first and second pulsed input signals and providing an output signal which follows either one of said input signals comprising:
    first means for dividing one of said input signals into a pair of identical but complementary pulse trains;
    second means receiving a first portion of the other of said input signals and one of said pulse trains and providing an output signal only upon the failure of the one input signal;
    an AND gate receiving the output of said second means and a second portion of the other input signal whereby the other input signal will pass through the AND gate only upon the occurrence of a failure in the one input signal; and,
    an OR gate receiving the other of said pulse trains and the output of said AND gate whereby either one or the other of the input signals will provide the output signal.

2. A redundant signal circuit having at least first and second identical pulsed input signals and providing an output signal which follows either one of said input signals in a predetermined order comprising:
    first means for dividing one of said input signals into a pair of identical but complementary pulse trains;
    second means receiving a first portion of the other of said input signals and one of said pulse trains and providing an output signal only upon the failure of the one input signal;
    an AND gate receiving the output of said second means and a second portion of the other input signal whereby the other input signal will pass through the AND gate only upon the occurrence of a failure in the one input signal; and,
    an OR gate receiving the other of said pulse trains and the output of said AND gate whereby either one or the other input signals will provide an output signal.

3. A redundant signal circuit having first and second identical input signals and providing an output signal identical to at least one of said input signals comprising:
    means for dividing said first input signal into two complementary output signals Q and $\bar{Q}$;
    logic means receiving a portion of said second input signal and said $\bar{Q}$ signal to provide a high output signal upon failure of said first input signal;
    an AND gate receiving said second input signal and said logic means output signal; and,
    an OR gate receiving said Q signal and said AND gate output.

4. The circuit recited in claim 3 wherein said signal dividing means is a monostable multivibrator.

5. The circuit recited in claim 3 wherein said logic means comprises a dual flip-flop circuit with clear by said $\bar{Q}$ signal.

6. A redundant signal circuit for transmitting at least two independent pulsed signals proportional to measured speed into a speed feedback circuit comprising:
    first and second input signal channels including identical signal conditioning means;
    a monostable multivibrator circuit in said first signal channel providing Q and $\bar{Q}$ outputs proportional to said first channel input signal;
    a dual J-K flip-flop circuit including one input from said second signal channel and a second input comprising the $\bar{Q}$ output, said $\bar{Q}$ input providing a clear signal;
    an AND gate having a first input connected to the J-K flip-flop circuit output and a second input connected to said second channel; and,
    an OR gate having a first input connected to the Q output and a second input connected to said AND gate output.

* * * * *